Aug. 19, 1947.   J. G. JACKSON   2,425,883
CONCRETE STRUCTURAL ELEMENT REINFORCED WITH GLASS FILAMENTS

Filed Aug. 8, 1941

John G. Jackson
INVENTOR

Patented Aug. 19, 1947

2,425,883

UNITED STATES PATENT OFFICE 2,425,883

CONCRETE STRUCTURAL ELEMENT REINFORCED WITH GLASS FILAMENTS

John G. Jackson, Detroit, Mich.

Application August 8, 1941, Serial No. 405,987

22 Claims. (Cl. 72—59)

This invention relates to reinforced structures and more particularly to structures with a cement base reinforced by various arrangements of fine drawn or blown glass fibres or filaments.

Fine drawn or blown glass fibres and filaments have extremely high tensile strength.

This invention has for its object the use of these fibres and filaments to reinforce structural members such as formed preferably of Portland cement or such other materials as magnesite cements, lime cements, and gypsum.

One form of the invention lies in the reinforcing of cement structures by means of rods or bars consisting of closely adherent groups of fine glass fibres or filaments bonded together into a unitary structure of any desired cross section and length, and used as concentrated reinforcing members in the same manner as steel rods have been used in the past. These rods or bars may be of an ultimate cross section approximating that of steel bars used for comparable reinforcing purposes; or, in many instances, a lesser cross section of the composite rod or bar reinforcement according to this invention will be permissible for the same reinforcing strength due to the high strength of the individual glass fibres or filaments and the bonding to be hereinafter described.

While a group or collection of fibres or filaments twisted, or otherwise arranged, could be used for reinforcing purposes with advantageous results, it has been found that the maximum tensile strength of the individual fibres cannot effectively be developed in this way because of the failure of the cement mass to contact and bond all of the individual fibres, thus permitting slipping of the individual fibres relative to each other and excessive elongation of the group of strands with excessive stressing of certain of them and consequent progressive failure of the group, thus failing to utilize the composite tensile strength of the grouped individual fibres.

To prevent this fibre slippage and uneven stressing of the individual fibres of the reinforcing member, it is found desirable to bond the strands together by a relatively inelastic bonding medium preventing relative movement between the individual filaments. One example of such bonding medium is a thermo-setting phenolic resin such as Bakelite, although other bonding mediums which, when set, are of a relatively inelastic nature are contemplated within the scope of the invention, the heat setting phenolic resin being given simply as a specific example of a suitable material, it being contemplated that any bonding medium which will intimately permeate and bond the mass of fibres and is relatively inelastic when set will be suitable.

This bonding medium may be applied to the fibres or filaments which are to form the composite bar in any desired manner as, for example, by dissolving a phenolic resin in acetone or other solvent applied to the filaments by impregnating the assembled mass which is to be formed into the reinforcing bar, subsequently evaporating the acetone, or, alternatively, the bonding medium may be applied to impregnate the mass of fibres while such medium is in a plastic state. To increase the bond between the cementitious structure and the fibrous reinforcing member, it may be desirable to deform the reinforcing member at spaced intervals along its length in a manner analogous to that previously used for solid reinforcing members such as those of steel. The impregnated fibres and filaments from which it is desired to form the reinforcing bar are pressed together for this purpose into an intimate mass with the fibres or filaments generally parallel to the longitudinal axis of the bar and with interspersed bonding material, with or without effecting at this time the setting of the bonding medium into its inelastic state.

In the case of the specific example of the heat setting phenolic resin, the pressing operation may be accompanied by the application of heat sufficient to effect polymerizing or setting of the phenolic resin to form a resultant relatively rigid bar member of finished form which may be placed in the cementitious base material at the desired point of reinforcement and in a manner common to the use of reinforcing rods such as steel. In all cases herein, it is to be understood that the cementitious mass is formed in ordinary mixes in any desired manner.

The formed structural reinforcing member may be placed in the cementitious material prior to effecting the setting of the bonding medium, in which case it is placed in the cementitious mix in its desired location and, after setting of the mix, the formed structural element is thereafter heated to a temperature to effect the softening and subsequent setting of the bonding medium, in which case a more intimate bond between the cementitious mass and the bonding material for the fibres is effected, and, hence, a more positive bond between the cementitious structure and the fibres forming the reinforcing member. In the case where the setting of the bonding medium is effected after the incorporation of the reinforcing bar in the structural member, the deformation of the bar along its length is perhaps not so important; but, even in this case, it is desirable as providing an additional means by which a sure bond between the structural member and the reinforcing fibres may be effected. In the impregnation of the mass of fibres or filaments, it may be desirable to provide for a surplus of the phenolic resin or other bonding medium at the exterior surface of the mass to which the cementitious mass will bond.

Another feature of the invention lies in the use of the fine drawn glass fibres or filaments loosely distributed in the cementitious body of the structural member in addition to those in the formed bar members previously described. In this arrangement, the fibres may be used either with or without the impregnating bonding medium as previously described and may be in the form of short fibres of a length suitable for being homogeneously mixed throughout the structural member or in the form of relatively long fibres, which may originally exist in the form of a fluff, distributed within the structural member by spreading and pressing the fibres and the cement together. The short fibres so mixed in the structural member and the fibrous fluff incorporated therein may be used in their natural blown or drawn state, or may be impregnated with the bonding medium previously described in order to secure a better bond to the cementitious mass in which they are distributed. Again, where the bonding medium is used, it may be set either before or after the incorporation of the reinforcing material in the structural member.

The fibrous fluff is in the form of a loose mat of relatively long fibers which may be impregnated with the bonding medium as previously described; for example, by dipping the same into a solution of the bonding medium with the solvent subsequently evaporated. To incorporate the fluff within the cement it may be spread out into a relatively thin layer with the cement aggregate spread thereon and the fluff and cement pressed together to obtain an intimate admixture thereof.

Certain features of the invention have been illustrated in the accompanying drawing in which Figure 1 is a side elevational view of a structural member according to the present invention.

Figure 1:
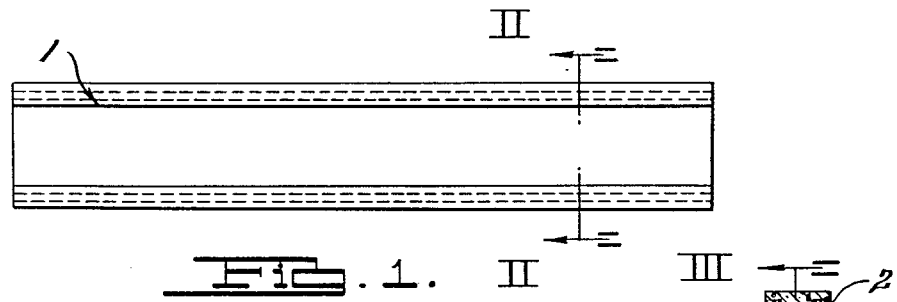
Figure 2:
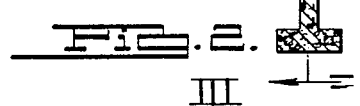
Figure 2 is a vertical sectional view on the line II—II of Figure 1.
Figure 3:
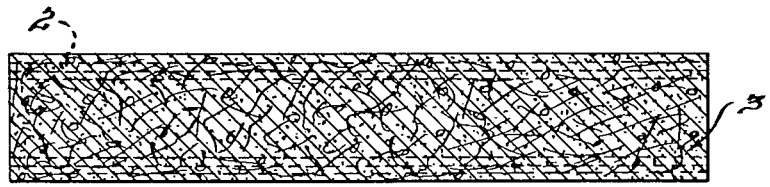
Figure 3 is a vertical sectional view on the line III—III of Figure 2.
Figure 4:
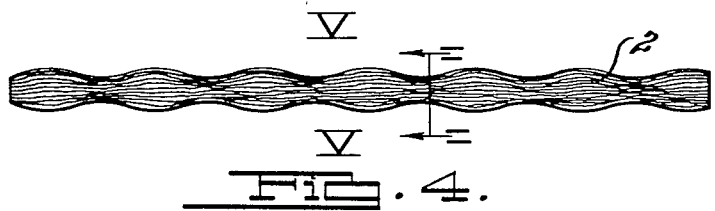
Figure 4 is a view showing a reinforcing bar in accordance with the present invention.
Figure 5:
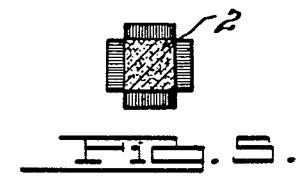
Figure 5 is a cross sectional view of the bar of Figure 4.

The structural member of Figure 1 is represented as a cementitious base structural element of I-beam cross section having embedded therein reinforcing bars 2 shown more in detail in Figures 4 and 5. Within the cementitious body portion of a structural member are distributed glass fibres or filaments as at 3. The structural bar 2 shown in Figures 4 and 5 comprises the bonded filaments or fibres distributed generally along the longitudinal axis of the bar and shown as deformed at intervals throughout its length as previously described. While the structural member of Figures 1, 2, 3 has been shown as incorporating bar 2 and the glass fibres 3, it is understood that these reinforcing means may be used alone as well as supplementary to each other.

While I have referred to the reinforcing fibres as of glass, it is to be understood that it is intended to include all fibres which may be similarly employed. As a number of examples, it may be noted that fibres of blown or drawn quartz or similar fibres blown or drawn from melted steatite are considered suitable for the applications described.

The term "Portland cement" as used in the claims is to be construed to include such other cements as magnesite cement, lime cement, gypsum, and mixes of the same.

While certain preferred embodiments of this invention have been specifically disclosed, it is understood that the invention is not limited thereto, as many variations will be readily apparent to those skilled in the art and the invention is to be given its broadest possible interpretation within the terms of the following claims.

What is claimed is:

1. A structural member comprised of a cementitious base and reinforced by a consolidated group of fine glass filaments bonded together by a heat setting resin which is heated to set condition after incorporation of the group in the base material to bond the filaments and effect an intimate bond between the resin and the cementitious base.

2. The method of forming a structural member which comprises forming a group of fine glass filaments into an elongated element by bonding the filaments together with a heat setting resin, forming a cementitious base with the element embedded therein as a concentrated reinforcement, and heating said member after setting of the cementitious base to effect setting of said bonding resin.

3. A structural member formed of Portland cement and provided with concentrated reinforcement in the form of a solid bar embedded therein, said bar being constituted by a consolidated group of fine glass filaments bonded together into a substantially rigid mass having substantial tensile strength.

4. A structural member comprised of a Portland cement base and provided with concentrated reinforcement embedded therein, said reinforcement comprising a consolidated group of fine glass filaments bonded together into a substantially rigid bar by a bonding medium which is substantially inelastic when set and which is intimately bonded to the base, said reinforcement having high tensile strength and increasing the resistance of the member to tensile forces.

5. A structural member comprised of a Portland cement base and provided with concentrated reinforcement embedded therein, said reinforcement comprising a consolidated group of fine glass filaments bonded together into a substantially rigid bar by a phenolic resin which is substantially inelastic when set, said bar having a substantial tensile strength and serving to increase the resistance of the structural member to tensile forces.

6. A structural member comprised of a Portland cement base and provided with concentrated reinforcement embedded therein, said reinforcement comprising a consolidated group of fine glass filaments bonded together into a substantially rigid bar by a phenolic resin which is substantially inelastic when set, said bar having substantial tensile strength and serving to increase the resistance of the structural member to tensile forces, said bar being formed with an irregular exterior surface interlocking with the cement base to prevent slippage therebetween.

7. A structural member comprised of a Portland cement base and provided with concentrated reinforcement embedded therein, said reinforcement being constituted by fine glass filaments bonded together into a substantially rigid and inelastic bar having substantial tensile strength and serving to increase the resistance of the structural member to tensile stresses.

8. A structural member comprised of a plurality of concentrated groups of fine glass filaments bonded together into substantially rigid and inelastic bars having substantial resistance to tensile stresses, and a material mass separating said bars and intimately bonded thereto throughout their length, said material mass being capable of absorbing appreciable compression and shear stresses.

9. A structural member comprising a plurality of consolidated groups of thin fibers or filaments of glass bonded together into substantially rigid and inelastic bars having substantial tensile strength, said bars being of insufficient cross section relative to their length to resist substantial compression stresses, and a material mass separating said bars and intimately bonded thereto throughout their length, said material mass having substantial resistance to compression and shear stresses.

10. A rigid beam or column type structural member for resisting bending stresses comprising a plurality of elongated consolidated groups of fine glass fibers bonded together into substantially rigid and inelastic bars spaced on opposite sides of a neutral axis, and a spacing medium between said groups and connected thereto, said spacing medium having substantial resistance to longitudinal shear and stiffening the fiber groups when in compression.

11. A structural member comprised of a Portland cement base and provided with both general and concentrated reinforcements, the general reinforcement for said member being constituted by fine glass filaments distributed throughout its mass, the concentrated reinforcement for said member being constituted by consolidated groups of fine glass filaments bonded together into substantially inelastic bars embedded in the member in positions to absorb tensile stresses.

12. A structural member comprised of a Portland cement base and provided with both general and concentrated reinforcements, the general reinforcement for said member being constituted by fine glass filaments distributed throughout its mass, said filaments having coatings thereon intimately bonded thereto and increasing their bond to the cement base, the concentrated reinforcement for said member being constituted by elongated consolidated groups of fine glass filaments bonded together into substantially rigid and inelastic bars embedded in the member in positions to absorb tensile stresses.

13. A structural member comprised of a Portland cement base and provided with general reinforcement constituted by fine glass filaments distributed throughout its mass.

14. A structural member comprised of a Portland cement base and provided with general reinforcement constituted by fine glass filaments distributed throughout its mass, said filaments being provided with coatings thereon intimately bonded thereto and increasing their bond to the cement base.

15. A structural member comprised of a Portland cement base and provided with general reinforcement constituted by fine glass filaments distributed throughout its mass, said filaments having coatings of a set resin bonded thereto and to the cement base.

16. A structural member comprised of a Portland cement base and provided with general reinforcement constituted by fine glass filaments distributed throughout its mass, said filaments having coatings of a phenolic resin in set condition intimately bonded thereto, said coatings bonding intimately to the cement base.

17. A structural member comprised of a Portland cement base and provided with general reinforcement constituted by a loose collection or "fluff" of fine glass filaments incorporated in the cement base.

18. A structural member comprised of a Portland cement base and provided with both general and concentrated reinforcement, the general reinforcement for said member being constituted by a loose collection or "fluff" of fine glass filaments incorporated in the base, the concentrated reinforcement for said member being constituted by consolidated groups of glass filaments bonded together into substantially rigid and inelastic bars embedded in the member in positions to absorb tensile stresses.

19. An article of manufacture comprising an elongated, substantially rigid and inelastic member formed of a relatively large number of fine glass filaments bonded together with a substantially inelastic bonding medium in intimate contact with substantially each of the filaments, the axes of the filaments being disposed generally parallel to the axis of the member, said member having a substantially high resistance to tensile stresses.

20. An article of manufacture comprising an elongated, substantially rigid and inelastic member formed of a relatively large number of fine glass filaments disposed with their axes substantially parallel to the axis of the member and bonded together with a heat set phenolic resin in intimate contact with substantially each of the filaments to prevent slippage therebetween and progressive failure thereof, whereby said member has a substantially high resistance to tensile stresses.

21. A structural force absorbing member comprising a consolidated group of a large number of thin fibers or filaments of glass bonded together by a set resin in intimate contact with substantially each of the filaments into a substantially rigid and inelastic bar, the filaments being disposed with their axes substantially parallel, the bar having substantially high resistance to at least tensile stresses.

22. A reinforcing bar for embedding in a rigid load carrying structure comprising a consolidated group of thin fibers or filaments of glass bonded together by a set resin in intimate contact with substantially each of the filaments into a substantially rigid and inelastic bar having substantially high resistance to tensile stresses, said bar being provided with non-planar surfaces to increase its bond to the medium in which it is embedded.

JOHN G. JACKSON.

REFERENCES CITED

The following references are of record in the file of this patent:

UNITED STATES PATENTS

| Number | Name | Date |
|---|---|---|
| 2,115,667 | Ellis | Apr. 26, 1938 |
| 2,184,899 | Shand | Dec. 26, 1939 |
| 2,176,837 | Ellis | Oct. 17, 1939 |
| 2,215,048 | McGregor et al. | Sept. 17, 1940 |
| 1,949,311 | Kitsee | Feb. 27, 1934 |
| 2,011,557 | Anderegg | Aug. 20, 1935 |
| 2,252,980 | Rhett | Aug. 19, 1941 |
| 516,113 | Ransome | Mar. 6, 1894 |
| 516,111 | Ransome | Mar. 6, 1894 |
| 2,312,227 | Yant | Feb. 23, 1943 |
| 2,219,054 | Palm et al. | Oct. 22, 1940 |
| 2,133,183 | Baird et al. | Oct. 11, 1938 |
| 2,271,443 | Schuh | Jan. 27, 1942 |
| 2,324,916 | Duncan et al. | July 20, 1943 |